(12) United States Patent
Chalkov

(10) Patent No.: US 8,847,996 B2
(45) Date of Patent: Sep. 30, 2014

(54) MOBILE TERMINAL AND CONTROL METHOD THEREOF

(75) Inventor: Sergey Chalkov, Seoul (KR)

(73) Assignee: LG Electronics Inc., Seoul (KR)

(*) Notice: Subject to any disclaimer, the term of this patent is extended or adjusted under 35 U.S.C. 154(b) by 354 days.

(21) Appl. No.: 13/314,084

(22) Filed: Dec. 7, 2011

(65) Prior Publication Data

US 2012/0306929 A1  Dec. 6, 2012

(30) Foreign Application Priority Data

Jun. 3, 2011  (KR) ........................ 10-2011-0054164

(51) Int. Cl.
*G09G 5/00* (2006.01)
*G06F 3/0488* (2013.01)

(52) U.S. Cl.
CPC .......... *G06F 3/0488* (2013.01); *G06F 3/04883* (2013.01); *G06F 3/04886* (2013.01); *G06F 2203/04808* (2013.01)
USPC .......................................... 345/666; 345/629

(58) Field of Classification Search
CPC .... G06F 3/04883; G06F 3/0488; G06F 3/044
USPC ................................................ 345/666, 629
See application file for complete search history.

(56) References Cited

U.S. PATENT DOCUMENTS

2011/0018835 A1* 1/2011 Murai et al. .................. 345/173
2012/0032891 A1* 2/2012 Parivar ........................... 345/173

FOREIGN PATENT DOCUMENTS

| KR | 10-2009-0108859 | 10/2009 |
| KR | 10-2010-0002423 | 1/2010 |
| KR | 10-2011-0045138 | 5/2011 |
| KR | 10-2011-0055058 | 5/2011 |

* cited by examiner

*Primary Examiner* — Maurice L McDowell, Jr.
(74) *Attorney, Agent, or Firm* — Lee, Hong, Degerman, Kang & Waimey

(57) ABSTRACT

A mobile terminal providing touch input and a control method thereof are provided. The mobile terminal includes: a controller executing a screen editing mode in response to an object generation command, and generating screen position information corresponding to a touched point on a screen when a touch input is detected in the screen editing mode; and a display unit displaying a generated object based on the screen position information when the object corresponding to the object generation command is generated.

30 Claims, 18 Drawing Sheets

MOBILE TERMINAL AND CONTROL METHOD THEREOF

CROSS REFERENCE TO RELATED APPLICATIONS

The present application claims the benefit of earlier filing date and right of priority to Korean Application No. 10-2011-0054164 filed on Jun. 3, 2011, the entire contents of which is hereby incorporated by reference in its entirety.

BACKGROUND OF THE INVENTION

1. Field of the Invention

The present invention relates to a mobile terminal and, more particularly, to a mobile terminal available for a touch input and a control method thereof.

2. Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components which form the mobile terminal.

Convenience of user interfaces can be enhanced according to the position and size of objects such as an icon, a widget, a thumbnail, or the like, displayed on a screen of a terminal. To improve such user convenience, a function of editing the layout of objects based on a touch input may be provided in the terminal.

SUMMARY OF THE INVENTION

An aspect of the present invention provides a mobile terminal capable of controlling a position and size of an object displayed on a screen.

According to an aspect of the present invention, there is provided a mobile terminal including: a controller executing a screen editing mode in response to an object generation command, and generating screen position information corresponding to a touched point on a screen when a touch input is detected in the screen editing mode; and a display unit displaying a generated object based on the screen position information when the object corresponding to the object generation command is generated.

When the screen editing mode is executed, the controller may set a plurality of grid cells and select a grid cell for putting the generated object therein based on the screen position information.

When the screen editing mode is executed, the display unit may display a plurality of lines demarcating the plurality of grid cells and display a plurality of nodes at crossings of the plurality of lines.

The controller may change the layout of the plurality of grid cells based on dragging with respect to at least one of the plurality of lines and the plurality of nodes.

The size of the displayed object may correspond to the size of the selected grid cell.

The object generation command may include an application download and installation command.

The generated object may include an application, a widget, multimedia content, an icon, or a thumbnail.

When dragging with respect to a first object corresponding to a first grid cell among the plurality of grid cells is detected, the controller may move the first object based on the dragging. When the first object is moved to overlap with a second object corresponding to a second grid cell, the controller may set lower grid cells within the second grid cell.

The display unit may display the first and second objects in first and second grid cells among the lower grid cells. A relative ratio between the sizes of the first and second objects may be maintained.

The controller may magnify or reduce the second grid cell based on a control command with respect to the second grid cell in which the lower grid cells have been set.

When dragging with respect to the first and second objects corresponding to the first and second grid cells, respectively, among the plurality of grid cells, is detected, the controller may move the first and second objects based on the dragging. When the first and second objects are moved to a third grid cell, the controller may set lower grid cells within the third grid cell.

When the screen editing mode is executed, the controller may generate an object frame for putting the generated object therein.

The controller may change the size and position of the object frame based on a control command with respect to the object frame.

The display unit may display the object frame based on the screen position information.

According to another aspect of the present invention, there is provided a method for controlling a mobile terminal, including: executing a screen editing mode in response to an object generation command; when a touch input is detected in the screen editing mode, generating screen position information corresponding to the touch point on the screen; generating an object corresponding to the object generation command; and displaying the generated object based on the screen position information.

The method may further include: when the screen editing mode is executed, setting a plurality of grid cells; and selecting a grid cell for putting the generated object therein based on the screen position information.

The setting of the plurality of grid cells may include: displaying a plurality of lines demarcating the plurality of grid cells in response to the object generation command, and displaying a plurality of nodes at crossings of the plurality of lines. The setting of the plurality of grid cells may further include: changing the layout of the plurality of grid cells based on dragging with respect to at least one of the plurality of lines and nodes.

The method may further include: when the screen editing mode is executed, generating an object frame for putting the generated object therein.

The method may further include: changing the size and position of the object frame based on a control command with respect to the object frame.

The generating of the object may include: downloading an application corresponding to the object generation command; installing the application; and generating an icon of the application.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Figure 1:
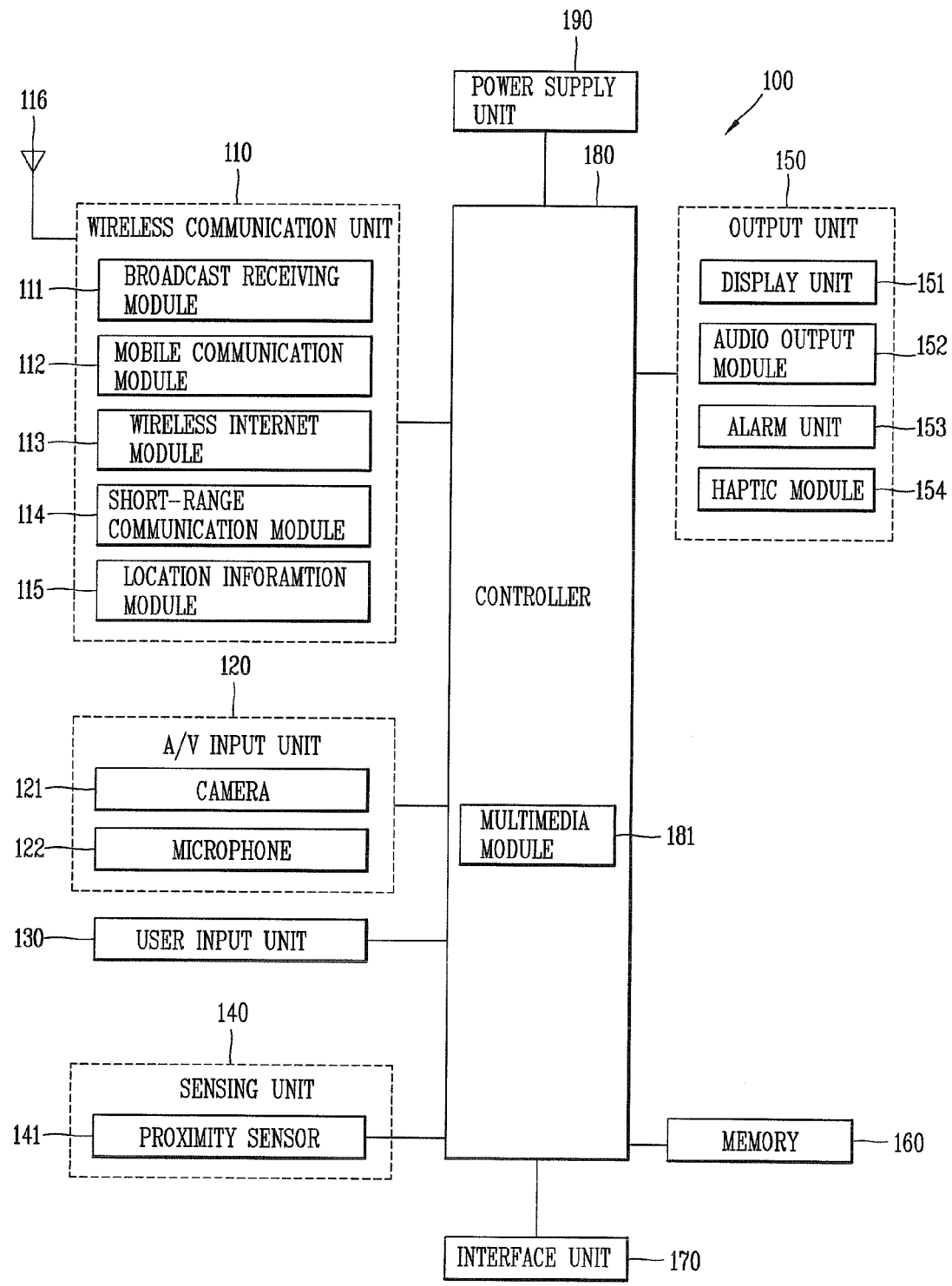
FIG. 1 is a schematic block diagram showing a mobile terminal according to an embodiment of the present invention.

FIG. 1 is a block diagram of a mobile terminal 100 according to an embodiment of the present invention. With reference to FIG. 1, the mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal as having various components, but it should be understood that implementing all of the illustrated components is not a requirement. Greater or fewer components may alternatively be implemented.

The elements 110 to 190 of the mobile terminal 100 will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. Here, the broadcast associated information may refer to information associated with a broadcast channel, a broadcast program or a broadcast service provider. The broadcast associated information may also be provided via a mobile communication network and, in this case, the broadcast associated information may be received by the mobile communication module 112. The broadcast signal and the broadcast associated information received via the broadcast receiving module 111 may be stored in the memory 160.

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 refers to a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal 100. A typical example of the location information module is a GPS (Global Positioning System).

With reference to FIG. 1, the A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The image frames processed by the camera 121 may be displayed on a display unit 151 (or other visual output device). The image frames may be stored in the memory 160 (or other storage medium) or transmitted via the wireless communication unit 110. Two or more cameras 121 may be provided according to the configuration of the mobile terminal 100.

The microphone 122 may receive sounds (audible data) in a phone call mode, a recording mode, a voice recognition mode, and the like, and process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal 100. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. Also, the sensing unit 140 may include a touch sensor (not shown) for detecting a touch operation with respect to the display unit 151.

The touch sensor may have a form such as a touch film, a touch sheet, a touch pad, or the like. The touch sensor may be configured to convert pressure applied to a particular portion of the display unit 151 or a change in the capacitance, or the like, generated at a particular portion of the display unit 151 into an electrical input signal. The touch sensor may be configured to detect the pressure when a touch is applied, as well as the touched position and area.

Meanwhile, when touch sensor and the display unit 151 are overlaid in a layered manner to form a touch screen, the display unit 151 may function as both an input device and an output device. Such a display unit may be called a 'touch screen'.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

When the touch screen is a capacitive type screen, the touch screen may be configured to detect proximity of an object (or a detection target) according to a change in an electric field based upon the proximity of the object. Such a touch screen may be classified as a proximity sensor 141.

The proximity sensor 141 is a sensor for detecting the presence or absence of an object by using the force of electromagnetism or infrared rays without a physical contact. Thus, the proximity sensor 141 has a considerably longer life span compared with a contact type sensor, and it can be utilized for various purposes. Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like.

In the following description, for the sake of brevity, recognition of the pointer positioned to be close to the touch screen will be called a 'proximity touch', while recognition of actual contacting of the pointer on the touch screen will be called a 'contact touch'.

The proximity sensor 141 detects a proximity touch and a proximity touch pattern (e.g., a proximity touch distance, a proximity touch direction, a proximity touch speed, a proximity touch time, a proximity touch position, a proximity touch movement state, or the like). Information corresponding to the detected proximity touch operation and the proximity touch pattern may be output to the touch screen.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (or output) information processed in the mobile terminal 100. For example, when the mobile terminal 100 is in a phone call mode, the display unit 151 may display a User Interface (UI) or a Graphic User Interface (GUI) associated with a call or other communication. When the mobile terminal 100 is in a video call mode or image capturing mode, the display unit 151 may display a captured image and/or received image, a UI or GUI, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, an e-ink display, or the like.

At least one of the displays included in the display unit 151 may be configured to be transparent to allow viewing of the exterior therethrough, which may be called transparent displays. A typical transparent display may be, for example, a TOLED (Transparent Organic Light Emitting Diode), or the like. The rear structure of the display unit 151 may include the light-transmissive structure. With such a structure, the user can view an object located at a rear side of the terminal body through the region occupied by the display unit 151 of the terminal body.

The mobile terminal 100 may include two or more display units 150 according to its embodiment. For example, a plurality of display units 150 may be separately or integrally disposed on one surface or disposed on different surfaces of the mobile terminal 100, respectively.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a receiver, a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile terminal 100 is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the vibration can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are input or output. In addition, the memory 160 may store data regarding various patterns of vibrations and audio signals output when a touch is input to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected to an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal 100 is properly mounted on the cradle.

The controller 180 typically controls the general operations of the mobile terminal 100. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a method for processing a user input with respect to the mobile terminal 100 will be described.

The user input unit 130 is manipulated to receive a command for controlling the operation of the mobile terminal 100 and may include a plurality of manipulation units. The manipulation units may be generally referred to as a manipulating portion, and various methods and techniques may be employed as the manipulation portion so long as they can be operated by using a user's tactile sensation.

Various types of visual information may be displayed on the display unit 151. The information may be displayed in the form of character, number, symbol, graphic, icon, etc, and may be displayed as a three-dimensional image. In order to input the information, at least one of characters, numbers, symbols, graphics and icons may be displayed in a certain array so as to be implemented in the form of a keypad. Such keypad may be a so-called 'soft key'.

The display unit 151 may be operated as a whole region or may be divided into a plurality of regions and operated accordingly. In the latter case, the plurality of regions may be operated in association with each other. For example, an output window and an input window may be displayed at upper and lower portions of the display unit 151, respectively. The output window and the input window are regions allocated for outputting or inputting information, respectively. Soft keys indicating numbers for inputting a phone number may be output to the input window. When soft keys are touched, numbers corresponding to the touched soft keys are displayed on the output window. When the manipulation unit is manipulated, a call connection to the phone number displayed on the output window may be attempted, or text displayed on the output window may be input to an application.

The display unit 151 or the touch pad may be configured to detect a touch through scrolling. The user may move a cursor or a pointer positioned on an entity, e.g., an icon, or the like, displayed on the display unit 151 by scrolling the display unit 151 or the touch pad. In addition, when the user moves his finger on the display unit 151 or the touch pad, the path along which the user's finger moves may be visually displayed on the display unit 151. This would be useful in editing an image displayed on the display unit 151.

One function of the terminal may be executed in case in which the display unit 151 and the touch pad are both touched within a certain time range. Both touches may be the result of a user's clamping the main body of the mobile terminal 100 with the user's thumb and index finger. The one function of the mobile terminal 100 executed may be, for example, activation or deactivation of the display unit 151 or the touch pad.

Figure 2A:
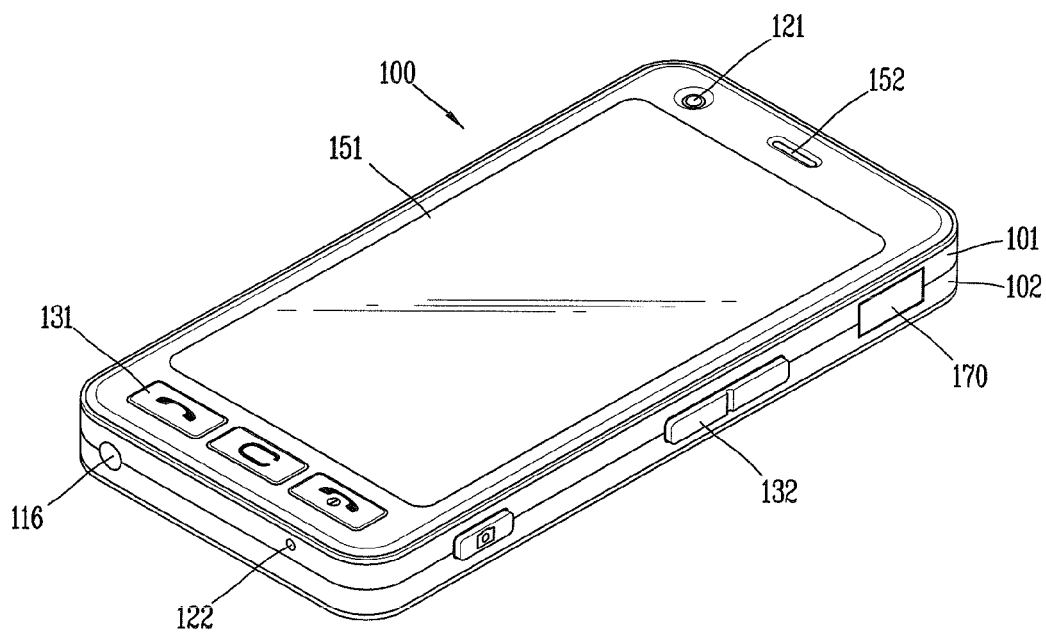
FIGS. 2A and 2B are perspective views showing an external appearance of the mobile terminal according to an embodiment of the present invention.
Figure 2B:
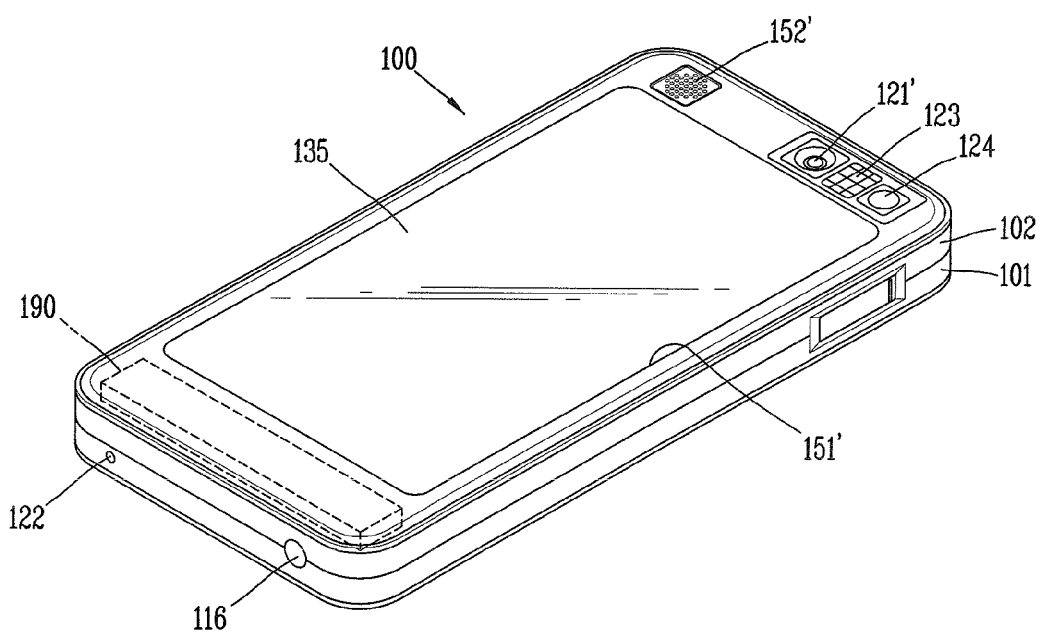

FIGS. 2A and 2B are perspective views showing an external appearance of the mobile terminal according to an embodiment of the present invention. FIG. 2A shows a front side and one side of the mobile terminal 100, and FIG. 2B shows a rear side and the other side of the mobile terminal 100.

With reference to FIG. 2A, the mobile terminal 100 has a bar type terminal body. However, the present invention can also be implemented as a slide type mobile terminal, a folder type mobile terminal, a swing type mobile terminal, a swivel type mobile terminal, or the like, including two or more bodies.

The terminal main body includes a case (or casing, housing, cover, etc.) constituting an external appearance of the terminal body. In the present exemplary embodiment, the case may be divided into a front case 101 and a rear case 102. Various electronic components are installed in the space between the front case 101 and the rear case 102. At least one intermediate case may be additionally disposed between the front case 101 and the rear case 102.

The cases may be formed by injection-molding a synthetic resin or may be made of a metallic material such as stainless steel (STS) or titanium (Ti), etc. A display unit 151, an audio output module 152, a camera 121, and a user input unit 130 (See FIG. 1), a microphone 122, an interface 170, and the like, may be disposed on the terminal body, mainly, on the front case 101.

The display unit 151 occupies a major portion of the front case 101. The audio output module 152 and the camera 121 are disposed at a region adjacent to one end portion of the display unit 151, and a first manipulation unit 131 and the microphone 122 are disposed at a region adjacent to another end portion of the display unit 151. A second manipulation unit 132 and the interface unit 170 may be disposed on the sides of the front case 101 and the rear case 102.

The user input unit 130 is manipulated to receive commands for controlling the operation of the mobile terminal 100. The user input unit 130 may include a plurality of manipulation units 131 and 132.

The manipulation units 131 and 132 may receive various commands. For example, the first manipulation unit 131 receives commands such as start, end, scroll, or the like, and the second manipulation unit 132 may receive commands such as adjustment of size of a sound output from the audio output module 152 or conversion into a touch recognition mode of the display unit 151, or the like.

With reference to FIG. 2B, a second camera 121' may additionally be disposed on a rear surface of the terminal main body, namely, on the rear case 102. The second camera 121' may have an image capture direction which is substantially opposite to that of the camera 121 (See FIG. 2A), and may support a different number of pixels (i.e., have a different resolution) than the camera 121.

For example, the camera 121 may operate with a relatively lower resolution, while the second camera 121' may operate with a relatively higher resolution. Accordingly, during a video call, when an image of the user's face is captured by using the camera 121 and transmitted to a counterpart in real time, the size of transmission data can be reduced. Meanwhile, the second camera 121' may be used for the purpose of storing an image of high picture quality.

Meanwhile, the cameras 121 and 121' may be installed in the terminal main body such that they can be rotated or popped up.

A flash 123 and a mirror 124, may be additionally disposed adjacent to the second camera 121'. When an image of the subject is captured with the second camera 121', the flash 123 illuminates the subject. The mirror 124 allows the user to see himself when he wants to capture his own image (i.e., self-image capturing) by using the second camera 121'.

A second audio output module 152' may be additionally disposed on the rear surface of the terminal main body. The second audio output module 152' may implement a stereoscopic function along with the audio output module 152 (See FIG. 2A), and may be used for implementing a speaker phone mode during call communication.

Besides the antenna for call communication, an antenna 116 for receiving a broadcast signal may be additionally disposed at the side of the terminal main body. The antenna 116 may be installed to be protracted from the terminal main body.

A power supply unit 190 for supplying power to the mobile terminal 100 may be mounted on the terminal main body in order to supply power to the mobile terminal 100. The power supply unit 190 may be installed in the terminal body or may be directly detached from the outside of the terminal main body.

A touch pad 135 for detecting a touch may be additionally mounted on the rear case 102. Like the display unit 151 (See FIG. 2A), the touch pad 135 may be configured as a light-transmissive type touch pad. Also, a rear display unit 151' may be additionally mounted on the touch pad 135 to output visual information. Here, information output from both of the front display unit 151 and the rear display unit 151' may be controlled by the touch pad 135.

The touch pad 135 is operated in relation to the display unit 151. The touch pad 135 may be disposed in parallel at the rear side of the display unit 151. The touch pad 135 may have a size which is the same as or smaller than the display unit 151.

Figure 3:
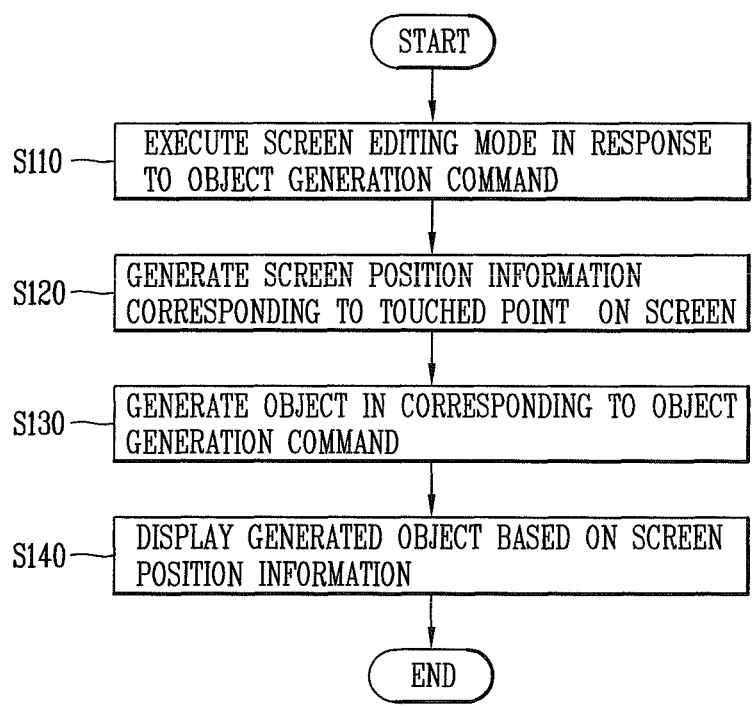
FIG. 3 is a flow chart illustrating a process of controlling a mobile terminal according to an embodiment of the present invention.

FIG. 3 illustrates a method for configuring a screen layout in relation to generation and displaying an object in the mobile terminal 100 according to an embodiment of the present invention.

FIG. 3 is a flow chart illustrating a process of a method for controlling a mobile terminal 100 according to an embodiment of the present invention. With reference to FIG. 3, a method for controlling the mobile terminal 100 includes step S110 of executing a screen editing mode in response to an object generation command.

The screen editing mode refers to a mode in which a screen layout of the display unit 151 (See FIG. 1) is set and changed. For example, in the screen editing mode, positions and sizes of objects displayed on the screen of the display unit 151 may be set and changed.

The object generation command may be determined based on an input through the user input unit 130 (See FIG. 1) and a touch input with respect to the display unit 151. The object generation command may include an application download and installation command. For example, when the mobile terminal 100 receives an object generation command, it accesses a server providing applications, downloads an application corresponding to the object generation command, and install the downloaded application.

When a touch input is detected in the screen editing mode, step S120 of generating screen position information corresponding to a touched point on the screen is performed. In generating the screen position information, a screen changing operation may be performed first. Namely, the screen changing operation may be performed first, and then, the screen position information with respect to the changed screen may be generated. For example, when a first screen image is currently displayed, the first screen image may be changed into a second screen image, and then, screen position information with respect to the second screen image may be generated.

Also, the method for controlling the mobile terminal 100 includes step S130 of generating an object corresponding to the object generation command. A time required for generating the object may vary according to the characteristics of objects. Thus, step S130 of generating an object may be performed before step S120 of generating screen position information.

The object may include a main object such as an application, a widget, or multimedia content (e.g., text, a photo image, a video, etc.) or may include a sub-object such as an icon or a thumbnail of the main object.

For example, in response to the object generation command, an application as a main object may be downloaded and installed, and an icon of the application may be generated as a sub-object. In this case, the icon of the application may be displayed.

When the object is generated, step S140 of displaying the generated object based on the screen position information is performed. For example, the generated object may be displayed on the touched point detected in the screen editing mode.

Hereinafter, the method for controlling a mobile terminal according to embodiments of the present invention will be described.

Figure 4:
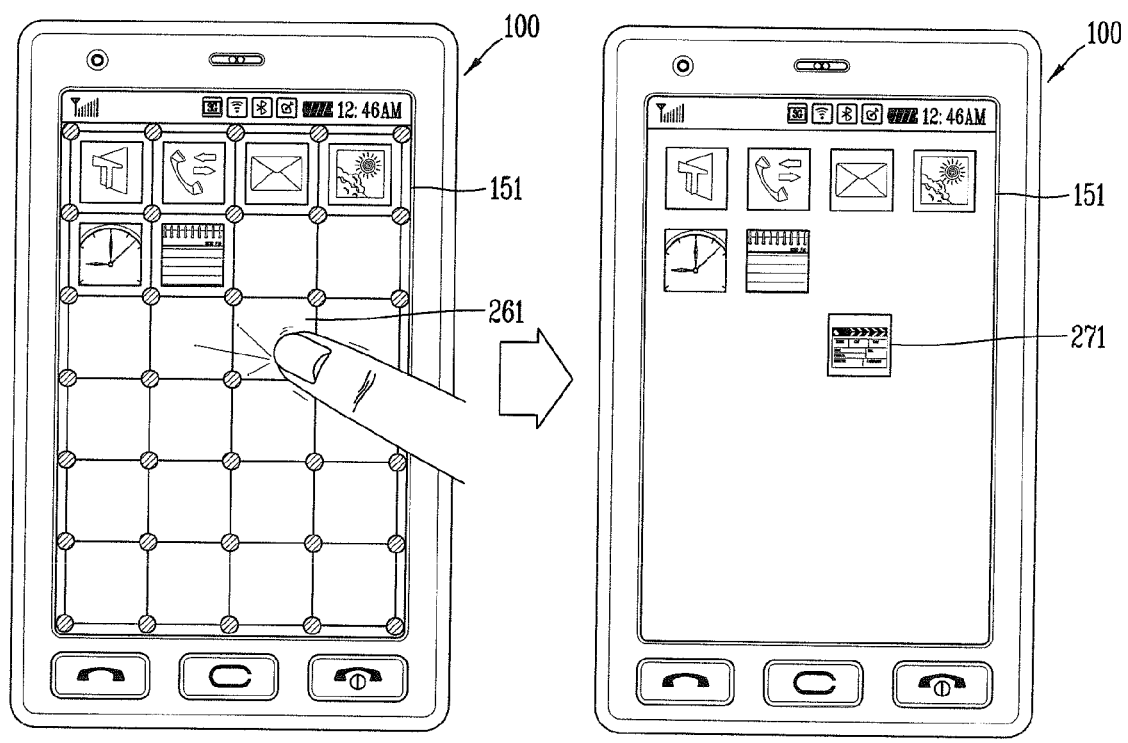
FIGS. 4 to 6 are conceptual views showing embodiments of user interfaces displaying objects generated by using a screen editing mode of a mobile terminal according to an embodiment of the present invention.
Figure 5:
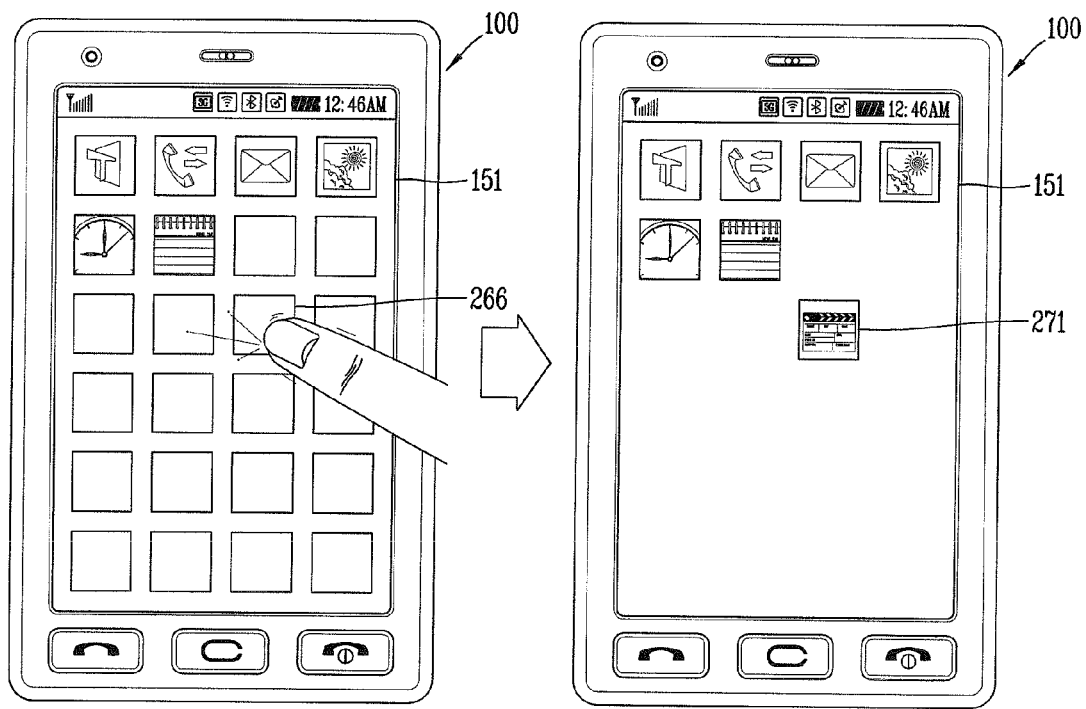
Figure 6:
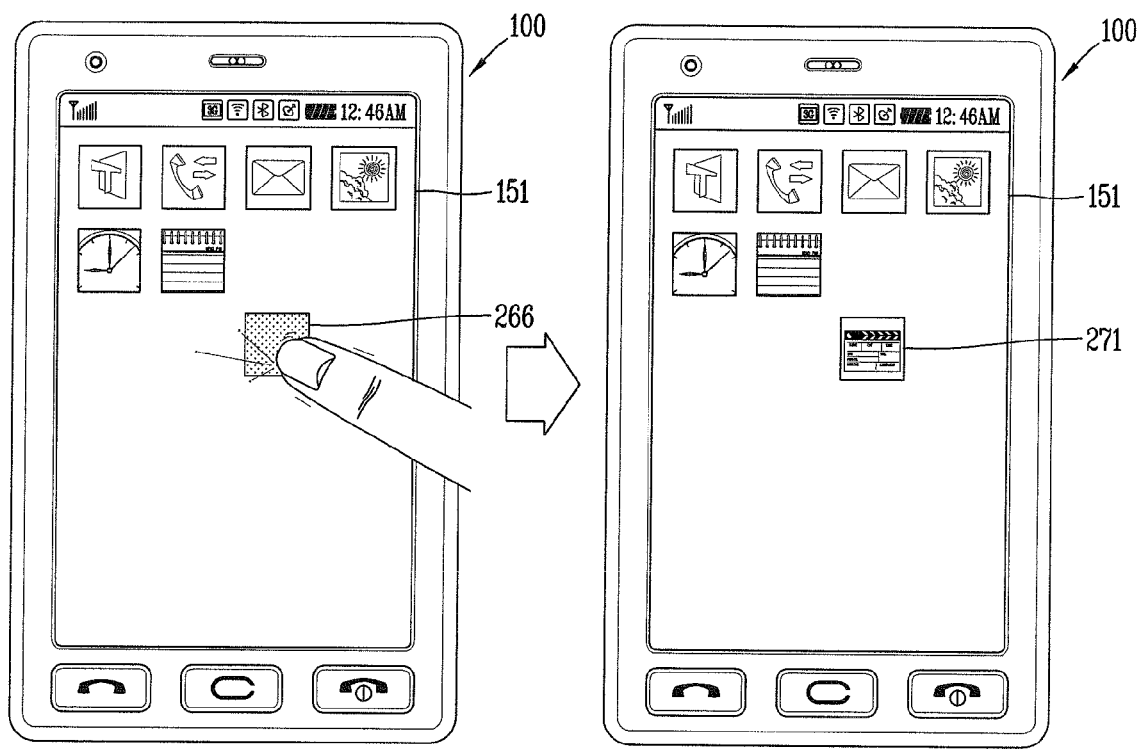

FIGS. 4 to 6 are conceptual views showing embodiments of user interfaces displaying objects generated by using a screen editing mode of a mobile terminal 100 according to an embodiment of the present invention.

With reference to FIG. 4, when a screen editing mode is executed in response to an object generation command, the controller 180 may set a plurality of grid cells and the display unit 151 may display the set grid cells. For example, the display unit 151 may display 20 (=4 (width)×5 (length)) grid cells each having the same size as initial setting. However, the size and number of grid cells displayed on the screen are not limited thereto and the grid cells may be variably configured.

Although the screen editing mode is executed to set grid cells, the display unit 151 may not display the set grid cells. Namely, the grid cells may be only internally set, without being displayed on the screen, by the controller 180.

In displaying the grid cells, the display unit 151 may display a plurality of lines demarcating the grid cells and display a plurality of nodes at the crossings of the lines. The lines and nodes may be moved based on a touch input, e.g., dragging, with respect to the display unit 151. Accordingly, the layout of the grid cells may be changed in the screen editing mode.

As described above, when a touch input is detected in the screen editing mode, the controller 180 may generate screen position information corresponding to the touch point on the screen. The generated screen position information may be stored in the memory 160 (See FIG. 1).

When an object corresponding to the object generation command is generated, the display unit 151 may display the object 271, e.g., an icon of the application, based on the screen position information. In other words, a grid cell 261 may be selected based on the screen position information and the generated object 271 may be put in the selected grid cell 261. In this case, the displayed object 271, namely, the size of the displayed object 271, may correspond to the size of the selected grid cell 261.

The screen editing mode may be released after the generated object 271 is put in the selected grid cell 261. Namely, an execution time of the screen editing mode may correspond a duration in which the object 271 is generated. Also, the screen editing mode may be released according to a user control command. Also, the screen editing mode may be released after the lapse of a pre-set time.

The display unit 151 may be controlled such that the grid cells disappear when the screen editing mode is released.

With reference to FIG. 5, when the screen editing mode is executed, the controller may set a plurality of object frames and the display unit 151 may display the set object frames. Thereafter, when screen position information is generated according to a user's touch input, the controller 180 may select an object frame 266 into which a generated object is placed based on the screen position information. The generated object may be put in the selected object frame 266. In this case, the generated object may be adjusted to fit the size of the selected object frame 266 and displayed accordingly.

Although a square object frame 266 is illustrated for displaying the object frame, the present invention is not limited thereto and the object frame 266 may be variably modified. Also, highlighting, blinking, an animation effect, or the like, may be applied to the object frame 266.

The controller 180 may change the size and position of the object frame 266 based on a control command with respect to the object frame 266. For example, when a pinch-in gesture or a pinch-out gesture with respect to the object frame 266 is detected, the controller 180 may magnify or reduce the object frame. Also, when dragging with respect to the object frame 266 is detected, the controller 180 may move the object frame 266 based on the detected dragging.

With reference to FIG. 6, when the screen position information is generated through a touch input in the screen editing mode, the controller 180 may generate the object frame 266 for placing the generated object therein, and the display unit 151 may display the generated object frame 266 based on the screen position information. Namely, the generated object frame 266 may be displayed at the touched position.

Here, the size and position of the generated object frame 266 may be changed based on a user's control command in such a manner as described above.

As a result, the object frame 266 may be one selected from among a plurality of object frames or may be an object frame generated in response to a touch input.

As described above, in the control method of the mobile terminal 100 according to an embodiment of the present invention, before an object 271 is generated and displayed on the screen, the position and size of the object are previously designated, whereby a screen layout fitting user preferences can be configured and a time required for generating the object can be effectively utilized.

FIGS. 7 to 11 are views showing embodiments of user interfaces displaying an object after changing the size of grid cells by using the screen editing mode of the mobile terminal 100 according to an embodiment of the present invention.

Figure 7:
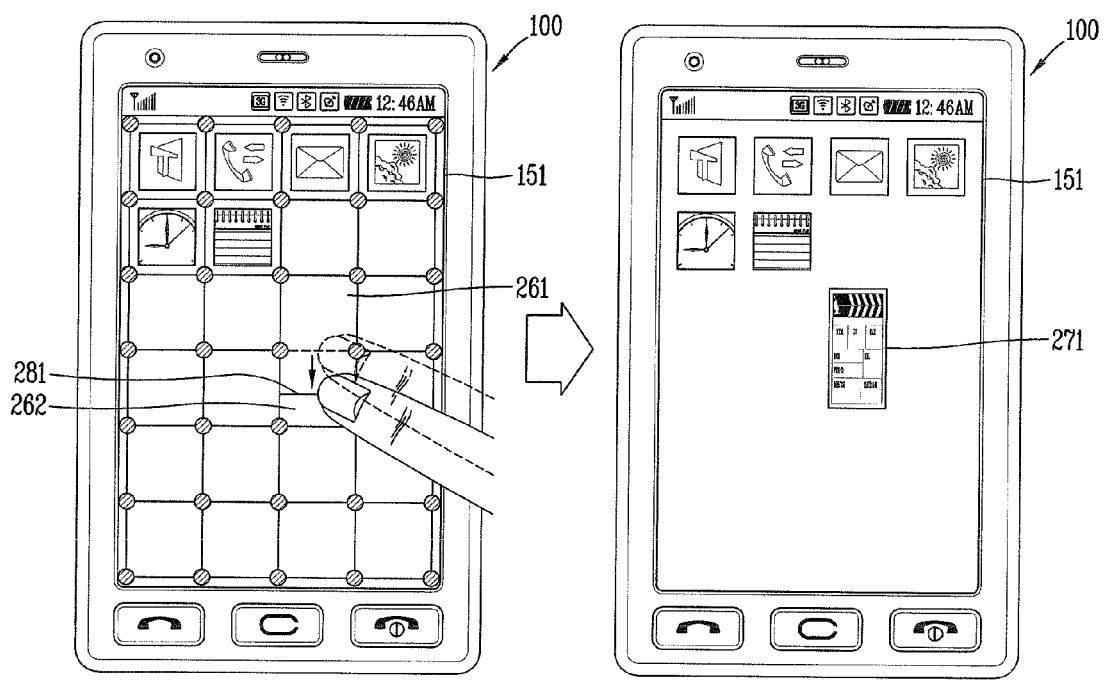
FIGS. 7 to 11 are views showing embodiments of user interfaces displaying an object after changing the size of grid cells by using the screen editing mode of the mobile terminal according to an embodiment of the present invention.

With reference to FIG. 7, when dragging with respect to a line 281 demarcating the first grid cell 261 and an adjacent second grid cell 262 is detected, the controller 180 may move the line 281 based on the dragging. And then, the controller 180 may change the size of the first 261 and second 262 grid cells according to the movement of the line 281.

For example, as illustrated in FIG. 7, when the line 281 is moved to the inside of the second grid cell 262, the size of the first grid cell 261 may be increased while the size of the second grid cell 262 may be reduced. Namely, a new demarcation may be defined for the first 261 and second 262 grid cells according to the movement of the line 281.

When the object 271 corresponding to the object generation command is generated, the display unit 151 may display the generated object 271 in the grid cell, e.g., the first grid cell 261, selected from among the plurality of grid cells. Here, the size of the displayed object 271 may correspond to the size of the first grid cell 261. The grid cell in which the generated object 271 is to be displayed may be selected based on a user input.

When the screen editing mode is released, the display unit 151 may be controlled to delete the lines and nodes.

Figure 8:
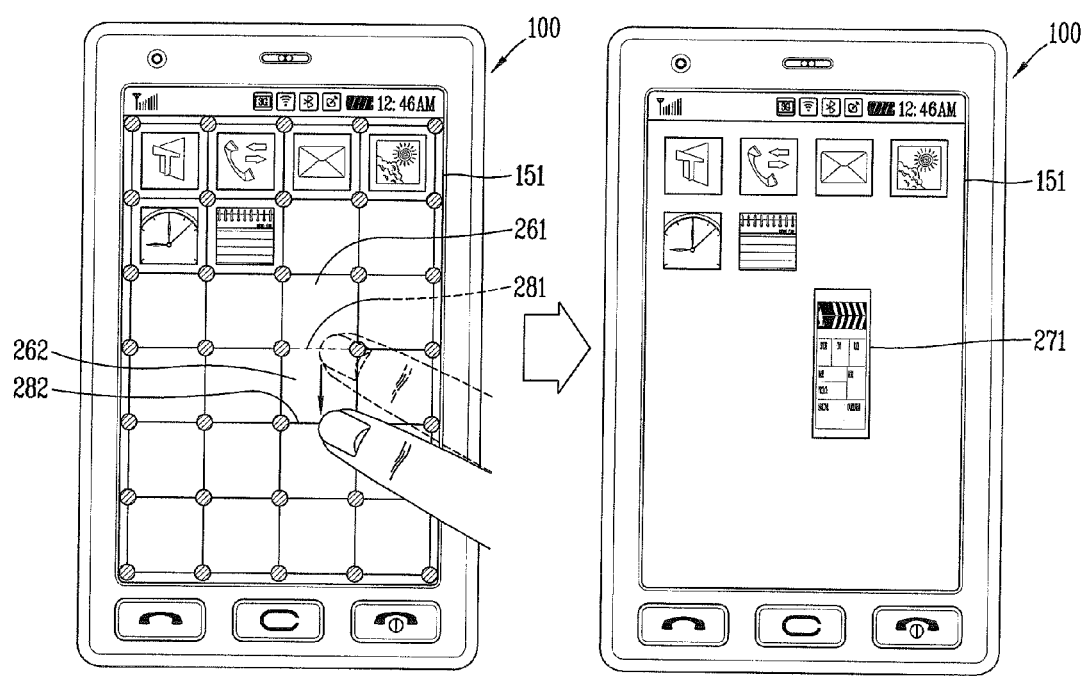

With reference to FIG. 8, when the line 281 demarcating the first grid cell 261 and the adjacent second grid cell 262 is moved to overlap with a different line 282, the controller 180 may merge the first 261 and second 262 grid cells.

The display unit 151 may display the generated object 271 in a grid cell newly formed according to the merge of the first 261 and second 262 grid cells. Here, the generated object 271 may be displayed with a size corresponding to the size of the newly formed grid cell.

Figure 9:
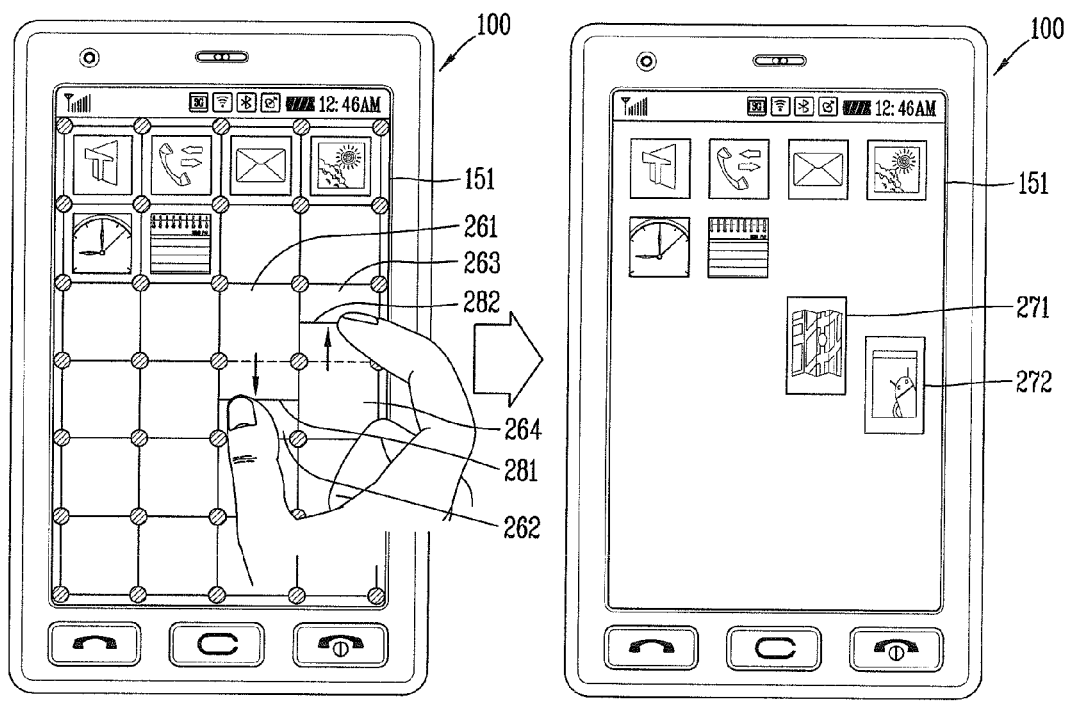

FIG. 9 illustrates editing the layout of the grid cells by using a multi-touch scheme. When first dragging with respect to the first line 281 and second dragging with respect to the second line 282 according to a multi-touch are simultaneously detected, the controller 180 may move the first 281 and second 282 lines based on the first dragging and the second dragging, respectively.

Here, the first line 281 refers to a line demarcating the first grid cell 261 and the adjacent second grid cell 262, and the second line 282 refers to a line demarcating a third grid cell 263 and a fourth grid cell 264 adjacent to the third grid cell 263.

The controller 180 may change the size of the first 261 to fourth 264 grid cells according to the movement of the first 281 and second 282 lines. For example, as illustrated, when the first line 281 is moved to the inside of the second grid cell 262, the size of the first grid cell 261 may be increased while the size of the second grid cell 262 may be reduced. Also, when the second line 282 is moved to the inside of the third grid cell 263, the size of the third grid cell 263 is reduced while the size of the fourth grid cell 264 may be increased.

When first 271 and second 272 objects corresponding to an object generation command are generated, the display unit 151 may display the generated objects 271 and 272 in the grid cells, e.g., in the first 261 and fourth 264 grid cells, selected from among the plurality of grid cells. Here, the size of the displayed objects 271 and 272 may correspond to the size of the first 261 and fourth 264 grid cells.

Figure 10:
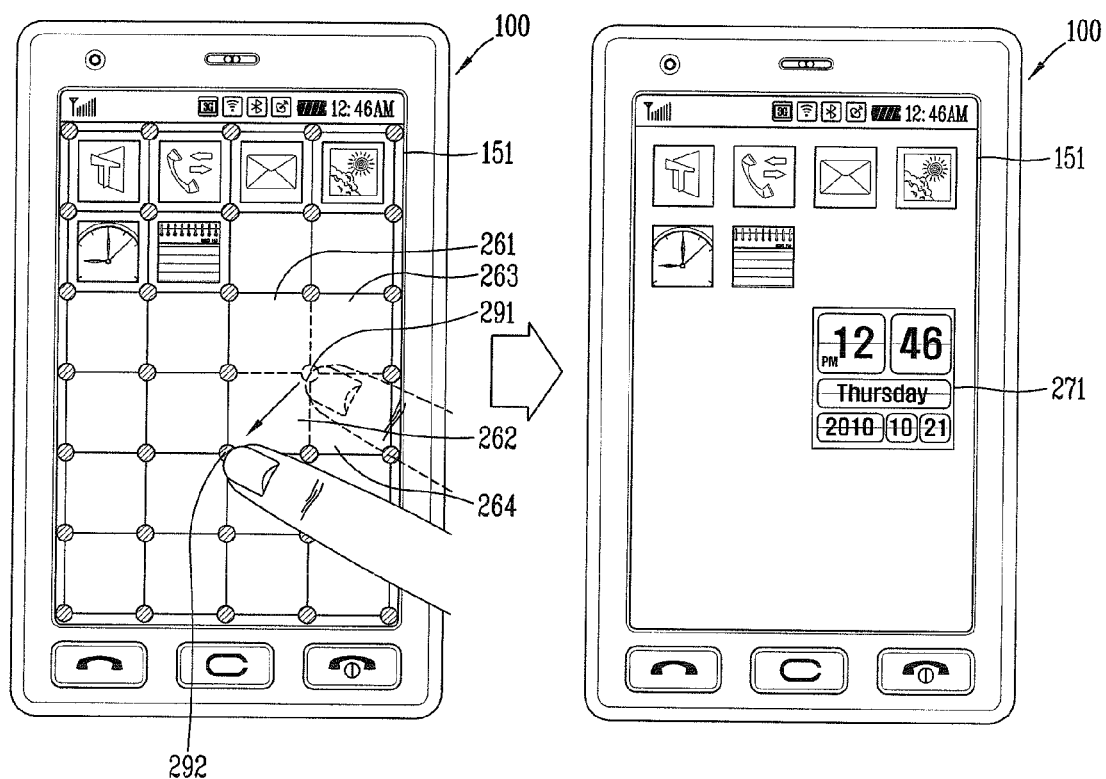

With reference to FIG. 10, when dragging with respect to a node 291 shared by the first 261 to fourth 264 grid cells is detected, the node 291 may be moved based on the detected dragging. Also, when the moved node 291 overlaps with a different node 292, the controller 180 may merge the first 261 to fourth 264 grid cells which have shared the node 291 before the node 291 was moved.

When the object 271 corresponding to an object generation command is generated, the display unit 151 may display the generated object 271 in a grid cell newly formed according to the merge of the first 261 to fourth 264 grid cells.

Figure 11:
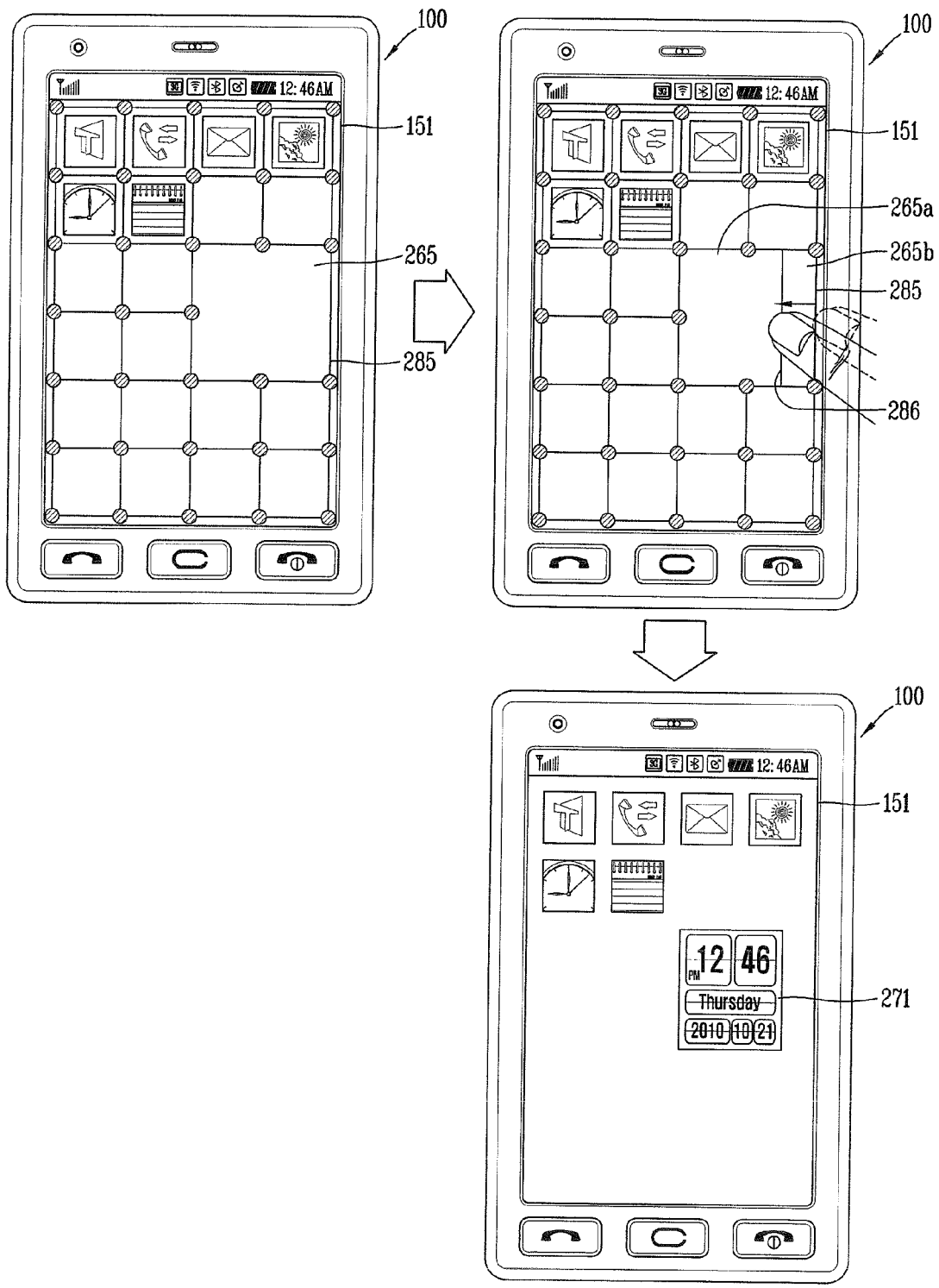

FIG. 11 illustrates adding a new line 286 to a grid cell 265 in the editing mode to divide the grid cell 265. When dragging with respect to a line 285 at the edge of the display area of the display unit 151 is detected, the controller 180 may divide the grid cell 265 corresponding to an end point of the dragging into two grid cells 265a and 265b.

The display unit 151 may display a line 286 demarcating the two grid cells 265a and 265b at the end point of the dragging. And then, when an object 271 corresponding to an object generation command is generated, the display unit 151 may display the generated object 271 in one of the two grid cells 265a and 265b. For example, the display unit 151 may display the generated object 271 in the grid cell 265a having a larger size.

Figure 12:
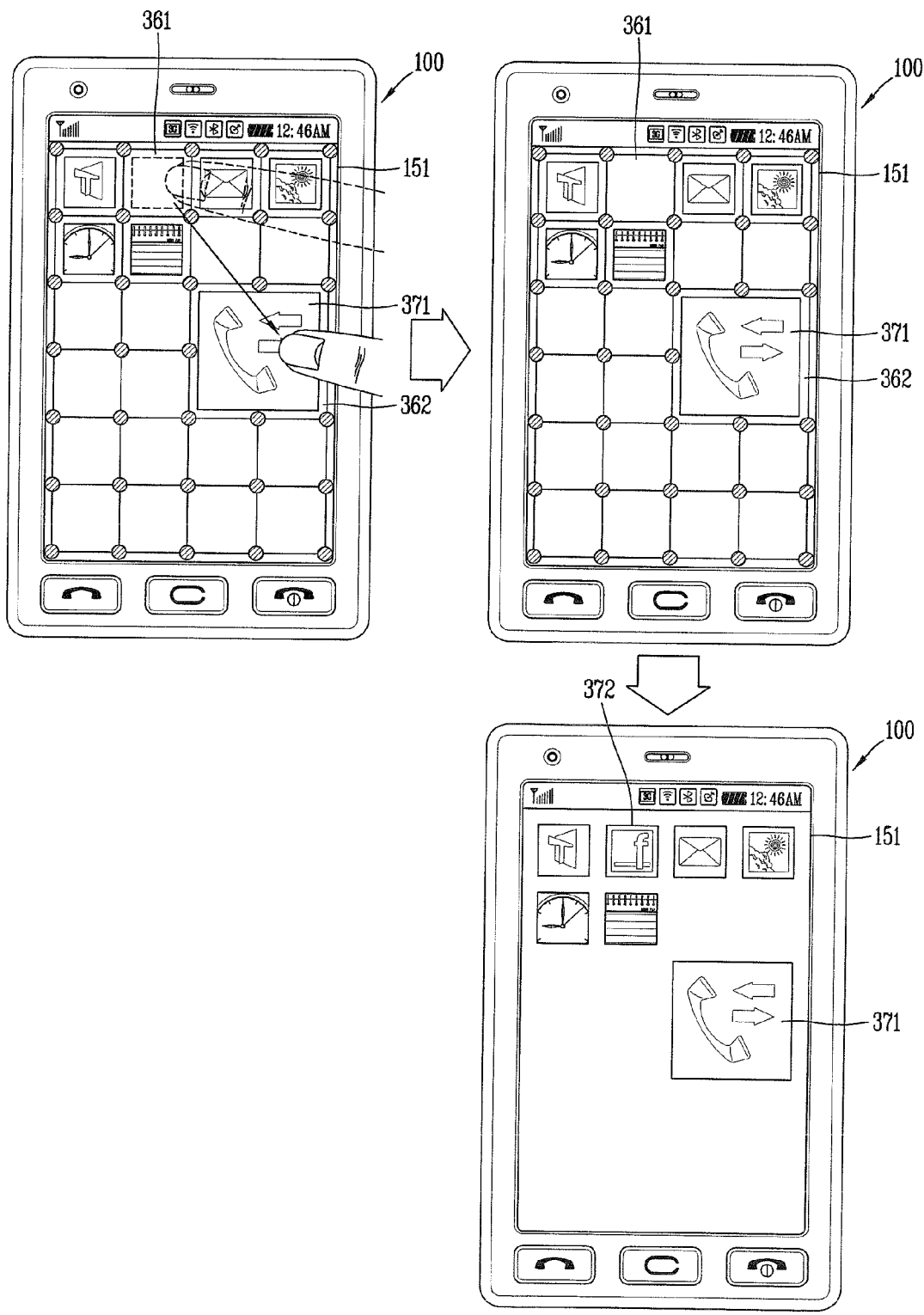
FIG. 12 is a conceptual view showing an embodiment of a user interface displaying a generated object after moving a displayed object by using a screen editing mode of a mobile terminal according to an embodiment of the present invention.

FIG. 12 is a conceptual view showing an embodiment of a user interface displaying a generated object after moving a displayed object by using a screen editing mode of a mobile terminal 100 according to an embodiment of the present invention.

With reference to FIG. 12, when the controller 180 detects dragging with respect to an object 371 displayed in a first grid cell 361 in the screen editing mode, the controller 180 may move the object 371 based on the detected dragging. For example, the controller 180 may move the object 371 to a second grid cell 362 having a different size from the size of the first grid cell 361. The size of the moved object 371 may be changed to have a size corresponding to the size of the second grid cell 362.

When an object 372 corresponding to an object generation command is generated, the display unit 151 may display the generated object 372 in the first grid cell 361. Namely, the display position of the generated object may correspond to the display position at which the moved object 372 was placed before.

FIGS. 13 to 16 are conceptual views showing embodiments of user interfaces providing a multi-layer grid cell structure by using an editing mode of a mobile terminal 100 according to an embodiment of the present invention.

Figure 13:
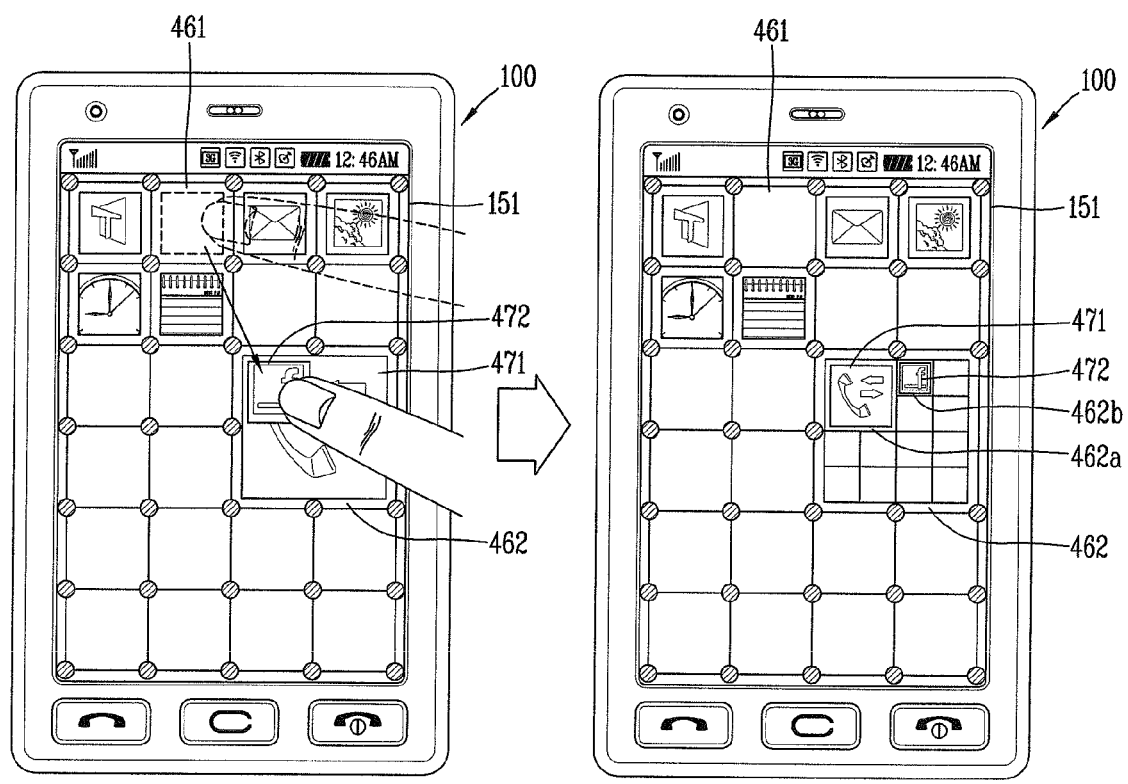
FIGS. 13 to 16 are conceptual views showing embodiments of user interfaces providing a multi-layer grid cell structure by using an editing mode of a mobile terminal according to an embodiment of the present invention.

With reference to FIG. 13, when the controller 180 detects dragging with respect to a first object 471 displayed in a first grid cell 461 in an editing mode, the controller may move the first object 471 based on the detected dragging. When the moved first object 471 overlaps with a second object 472 corresponding to a second grid cell 462, the controller 180 may set lower grid cells within the second grid cell 462.

The controller 180 may set the lower grid cells based on the ratio between relative sizes of the first 471 and second 472 objects. For example, when the first object 471 is larger than the second object 472, a first lower grid cell 462a corresponding to the first object 471 may be set to have a size greater than a second lower grid cell 462b corresponding to the second object 472.

The display unit 151 may display the first 471 and second 472 objects in the first 462a and second 462b lower grid cells among the lower grid cells. Here, although the size of the first 471 and second 472 objects is reduced, the ratio between their relative sizes may be maintained.

Figure 14:
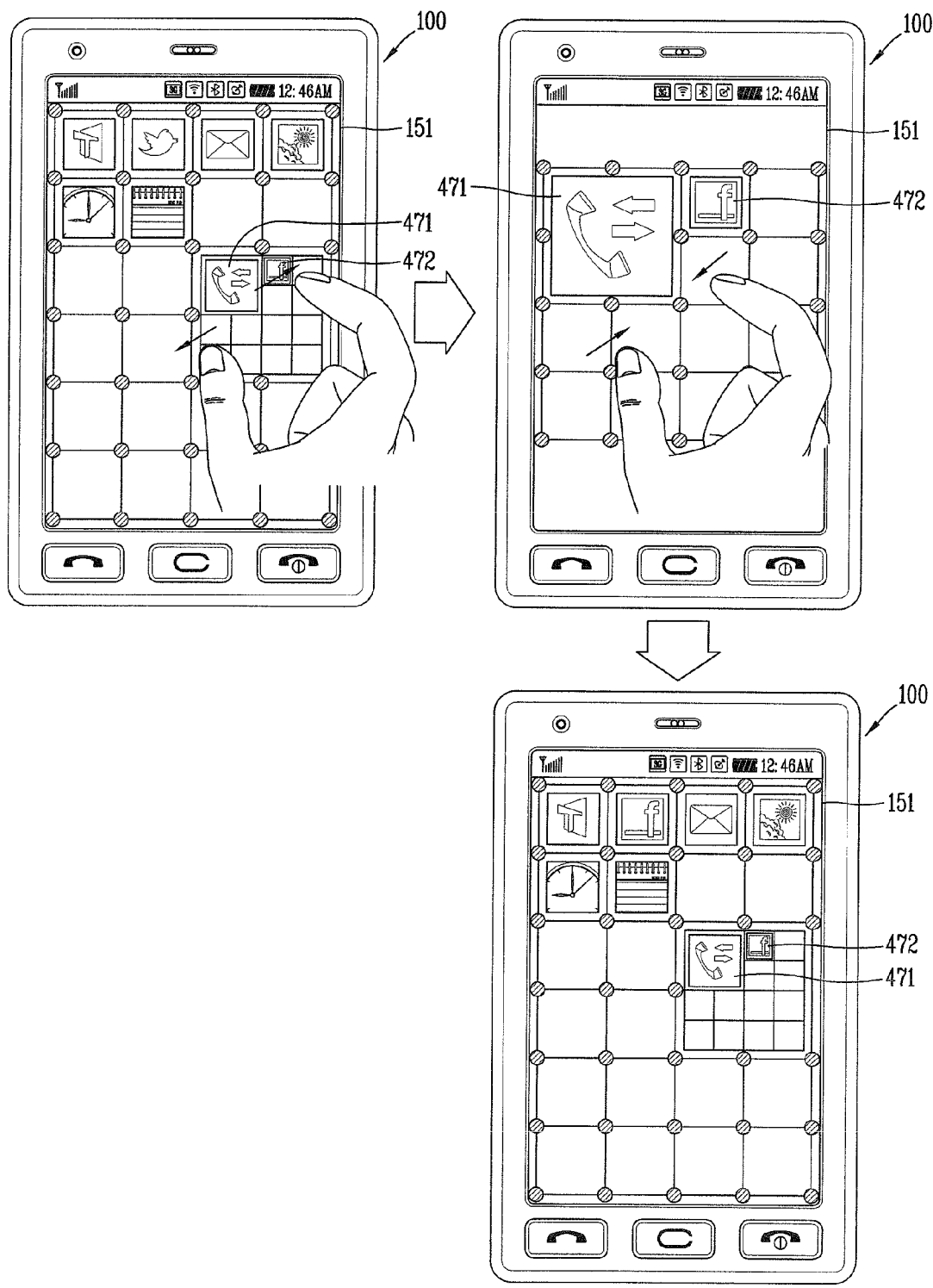

With reference to FIG. 14, the controller 180 may magnify or reduce the upper grid cell having lower grid cells therein based on a user input. For example, when a pinch-in gesture with respect to the upper grid cell is detected, the controller 180 may magnify the upper grid cell. Also, when a pinch-out gesture with respect to the magnified upper grid cell is detected, the controller 180 may reduce the upper grid cell.

In this manner, when multi-layered grid cell structure is set, the controller 180 may control the display unit 151 to convert an upper layer screen into a lower layer screen, or vice versa, based on a user's input. Here, the upper layer screen refers to a screen displaying entities corresponding to the upper grid cells, and the lower layer screen refers to a screen displaying objects corresponding to the lower grid cells.

Figure 15:
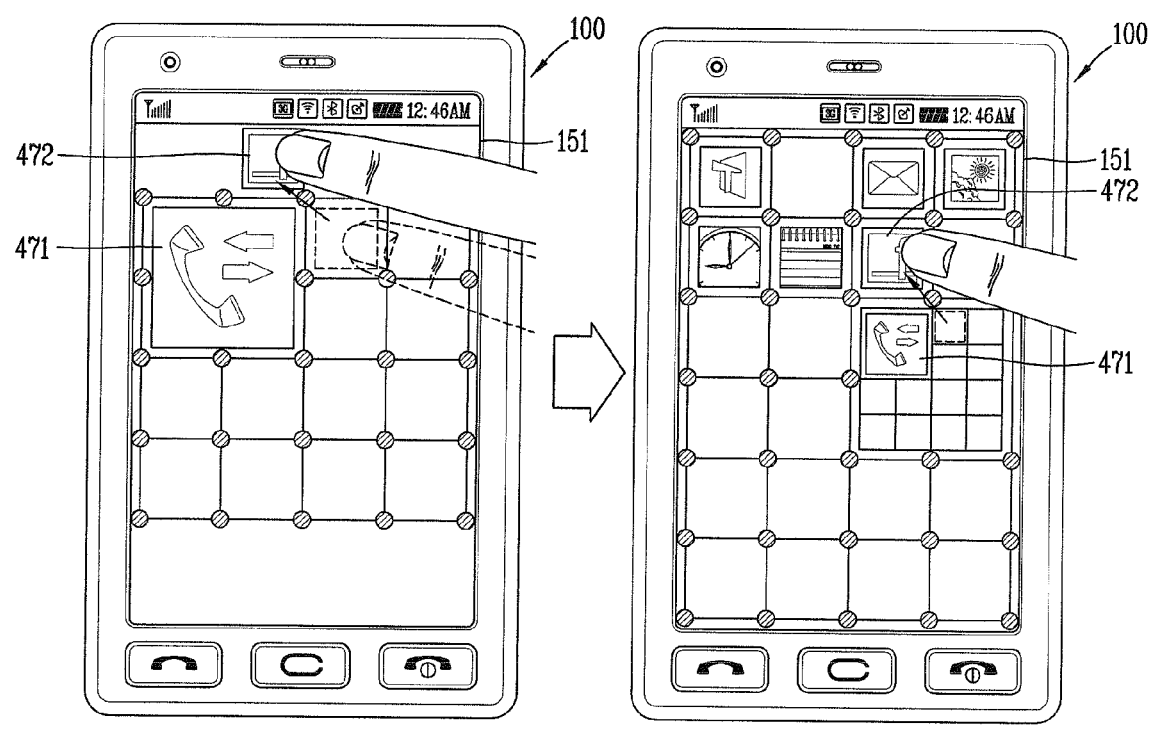

FIG. 15 illustrates changing from a lower layer screen to an upper layer screen in the screen editing mode. When at least one of objects of the lower layer screen, e.g., the second object 472, among the first 471 and second 472 objects, gets out of the line of the edge of the lower layer screen, the controller 180 may control the display unit 151 to change from the lower layer screen to the upper layer screen.

In this case, as the lower grid cells are reduced on the upper layer screen, the first object 471 is also reduced. And, the second object 472 may be displayed in an upper grid cell corresponding to an end point of dragging.

Figure 16:
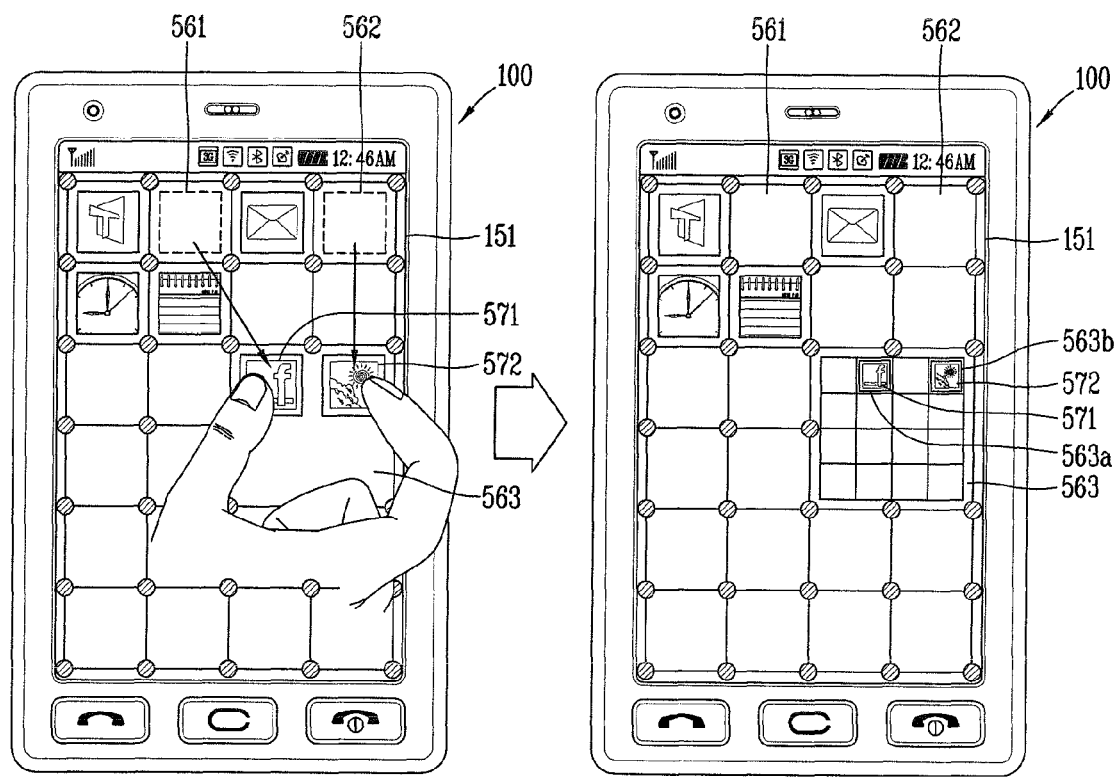

FIG. 16 is a conceptual view showing an embodiment of a user interface using a multi-touch scheme in a screen editing mode of a mobile terminal 100 according to an embodiment of the present invention.

With reference to FIG. 16, when first dragging with respect to a first object 571 and second dragging with respect to a second object 572 are simultaneously detected as a multi-touch, the controller 180 may move the first 571 and second 572 objects based on the first dragging and the second dragging. Here, the first 571 and second 572 objects refer to objects which were displayed on the first 561 and second 562 grid cells.

When the first 571 and second 572 objects are moved to an empty grid cell, e.g., a third grid cell 563, the controller 180 may set lower grid cells within the third grid cell 563.

The lower grid cells for displaying the first 571 and second 572 objects may be determined based on a relative position relationship between the first 571 and second 572 objects. For example, as illustrated, a display unit 151 may display the first and second objects in first 563a and second 563b lower grid cells among the lower grid cells. Namely, the position relationship between the first 571 and second 572 objects corresponding to the upper layer screen may also be maintained on the lower layer screen. Also, although the size of the first 571 and second 572 objects is reduced, the ratio of their relative size may be maintained.

Figure 17:
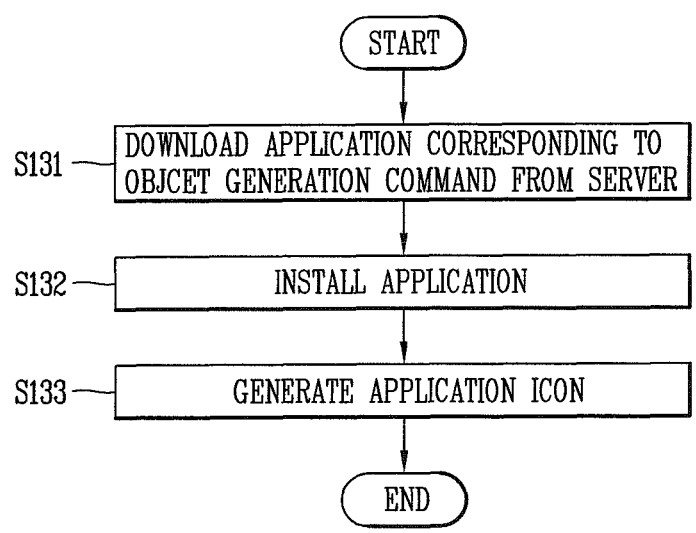
FIG. 17 is a flow chart illustrating a process of generating the object according to an embodiment of the present invention.

FIG. 17 is a flow chart illustrating a process of generating the object according to an embodiment of the present invention. As described above, when an object generation command includes an application download and installation command, the mobile terminal 100 may perform an application download and installation operation in response to the object generation command.

With reference to FIG. 17, the step S130 (See FIG. 3) of generating an object according to an embodiment of the present invention may include step (S131) of downloading an application corresponding to the object generation command from a server. Here, the server refers to a server that stores and manages various applications.

When downloading of the application is completed according to a corresponding request, step (S132) of installing the application is performed. When the installation of the application is completed, step (S133) of generating an application icon is performed. As described above, the generation of an object corresponding to the object generation command refers to the generation of an icon of the application as well as downloading and installation of the application.

Figure 18:
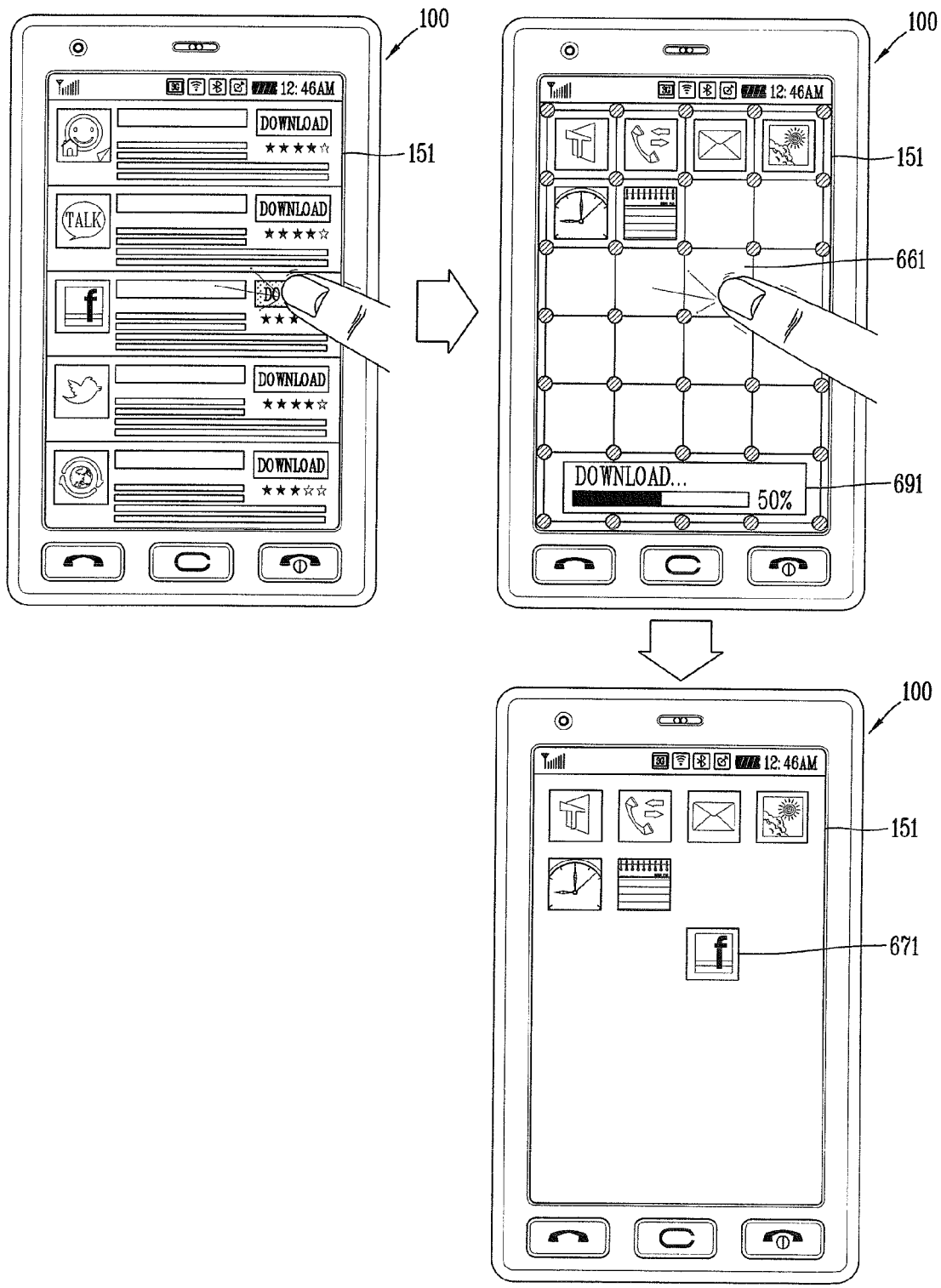
FIG. 18 is a conceptual view showing an operational example of a mobile terminal according to the control method illustrated in FIGS. 3 to 16.

FIG. 18 is a conceptual view showing an operational example of a mobile terminal 100 according to the control method illustrated in FIGS. 3 to 16. The mobile terminal 100 may access a server through a wired or wireless Internet, a wireless data communication network, or the like, in order to download an application. The mobile terminal 100 may receive an application list from the server.

With reference to FIG. 18, a display unit 151 may display the application list received from the server. When a selection of the applications on the application list is detected, the controller 180 may request downloading of the selected application from the accessed server. Here, the controller 180 may execute a screen editing mode and the display unit 151 may display grid cells.

The display unit 151 may display supplementary information related to the generation of the object corresponding to the object generation command in the screen editing mode. For example, as illustrated, when an application is downloaded and installed, the display unit 151 may display an indicator 691 indicating the degree of progress with respect to the downloading and installation.

When an icon of the application 671 is generated, the display unit 151 may display the generated icon 671 based on screen position information. Namely, the generated icon 671 may be put in a grid cell 661 selected according to a touch input. When the screen editing mode is released, as described above, the display unit 151 may be controlled to make the grid cells disappear.

As described above, in the mobile terminal 100 according to an embodiment of the present invention, before an object is generated and displayed on the screen, the position and size of the object are previously designated, whereby a screen layout fitting user preferences can be configured and a time required for generating the object can be effectively utilized.

In the embodiments of the present invention, the foregoing method can be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal 100 according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:
1. A mobile terminal, comprising:
a display unit configured to display information; and
a controller configured to:
detect an object generation command;
execute a screen editing mode in response to the detected object generation command;

detect a touch input on a screen of the display unit in the screen editing mode;
generate screen position information corresponding to a touched point on the screen in response to detecting the touch input;
generate an object;
control the display unit to display a plurality of grid cells;
select a grid cell of the displayed plurality of grid cells in which to display the generated object, the grid cell selected based on the generated screen position information; and
control the display unit to display the generated object in the selected grid cell.

2. The mobile terminal of claim 1, wherein the controller is further configured to control the display unit to display a plurality of lines demarcating the displayed plurality of grid cells and to display a plurality of nodes at crossings of the plurality of lines.

3. The mobile terminal of claim 2, wherein the controller is further configured to:
detect dragging with respect to at least one of the displayed plurality of lines and the displayed plurality of nodes; and
control the display unit to change a layout of the displayed plurality of grid cells based on the detected dragging.

4. The mobile terminal of claim 1, wherein a size of the displayed generated object corresponds to a size of the selected grid cell.

5. The mobile terminal of claim 1, wherein the controller is further configured to:
detect dragging with respect to a first object corresponding to a first grid cell of the displayed plurality of grid cells;
control the display unit to move the first object based on the detected dragging; and
control the display unit to display a plurality of lower grid cells within a second grid cell of the displayed plurality of grid cells when the moved first object overlaps a second object corresponding to the second grid cell.

6. The mobile terminal of claim 5, wherein the controller is further configured to control the display unit to display the first object in a first of the displayed plurality of lower grid cells and to display the second object in a second of the displayed plurality of lower grid cells.

7. The mobile terminal of claim 6, wherein the controller is further configured to control the display unit to maintain a relative ratio between sizes of the displayed first and second objects.

8. The mobile terminal of claim 6, wherein the controller is further configured to:
detect a control command related to the second grid cell in which the plurality of lower grid cells have been displayed; and
control the display unit in response to detecting the control command to magnify or reduce the second grid cell in which the plurality of lower grid cells have been displayed.

9. The mobile terminal of claim 1, wherein the object generation command comprises an application download and installation command.

10. The mobile terminal of claim 1, wherein the generated object comprises an application, a widget, multimedia content, an icon, or a thumbnail.

11. The mobile terminal of claim 1, wherein the controller is further configured to:
detect dragging with respect to a first object corresponding to a first grid cell of the displayed plurality of grid cells;
detect dragging with respect to a second object corresponding to a second grid cell of the displayed plurality of grid cells;
control the display unit to move the first and second objects based on the detected dragging; and
control the display unit to display a plurality of lower grid cells within a third grid cell of the displayed plurality of grid cells when the first and second objects are moved to the third grid cell.

12. The mobile terminal of claim 1, wherein the controller is further configured to control the display unit to generate and display an object frame in which to place the displayed generated object.

13. The mobile terminal of claim 12, wherein the controller is further configured to:
detect a control command related to the displayed object frame; and
control the display unit to change a size and position of the displayed object frame based on the detected control command.

14. The mobile terminal of claim 12, wherein the controller is further configured to control the display unit to display the generated object frame based on the generated screen position information.

15. The mobile terminal of claim 1, wherein the controller is further configured to generate the object by:
downloading an application corresponding to the detected object generation command;
installing the application; and
generating an icon related to the application.

16. A method for controlling a mobile terminal, the method comprising:
detecting an object generation command;
executing a screen editing mode in response to the detected object generation command;
detecting a touch input on a screen in the screen editing mode;
generating screen position information corresponding to a touched point on the screen in response to detecting the touch input;
generating an object;
displaying a plurality of grid cells; and
selecting a grid cell of the displayed plurality of grid cells in which display the generated object, the grid cell selected based on the generated screen position information; and
displaying the generated object in the selected grid cell.

17. The method of claim 16, wherein displaying the plurality of grid cells comprises:
displaying a plurality of lines demarcating the plurality of grid cells; and
displaying a plurality of nodes at crossings of the plurality of lines.

18. The method of claim 16, wherein displaying the plurality of grid cells further comprises:
detecting dragging with respect to at least one of the displayed plurality of lines and the displayed plurality of nodes; and
changing a layout of the displayed plurality of grid cells based on the detected dragging.

19. The method of claim 16, wherein a size of the displayed generated object corresponds to a size of the selected grid cell.

20. The method of claim 16, further comprising:
detecting dragging with respect to a first object corresponding to a first grid cell of the displayed plurality of grid cells;

moving the first object based on the detected dragging; and displaying a plurality of lower grid cells within a second grid cell of the displayed plurality of grid cells when the moved first object overlaps a second object corresponding to the second grid cell.

21. The method of claim 20, further comprising:

displaying the first object in a first of the displayed plurality of lower grid cells; and displaying the second object in a second of the displayed plurality of lower grid cells.

22. The method of claim 21, further comprising maintaining a relative ratio between sizes of the displayed first and second objects.

23. The method of claim 21, further comprising:

detecting a control command related to the second grid cell in which the plurality of lower grid cells have been displayed; and magnifying or reducing, in response to detecting the control command, the second grid cell in which the plurality of lower grid cells have been displayed.

24. The method of claim 16, wherein the object generation command comprises an application download and installation command.

25. The method of claim 16, wherein the generated object comprises an application, a widget, multimedia content, an icon, or a thumbnail.

26. The method of claim 16, further comprising:

detecting dragging with respect to a first object corresponding to a first grid cell of the displayed plurality of grid cells;

detecting dragging with respect to a second object corresponding to a second grid cell of the displayed plurality of grid cells;

moving the first and second objects based on the detected dragging; and displaying a plurality of lower grid cells within a third grid cell of the displayed plurality of grid cells when the first and second objects are moved to the third grid cell.

27. The method of claim 16, further comprising generating and displaying an object frame in which to place the displayed generated object.

28. The method of claim 27, further comprising:

detecting a control command related to the generated object frame; and changing a size and position of the displayed object frame based on the detected control command.

29. The method of claim 27, further comprising displaying the generated object frame based on the generated screen position information.

30. The method of claim 16, wherein generating the object comprises:

downloading an application corresponding to the detected object generation command;

installing the application; and generating an icon related to the application.

\* \* \* \* \*